J. M. SPAKE.
KAFIR CORN HEADER.
APPLICATION FILED JULY 20, 1915.
1,198,966.
Patented Sept. 19, 1916.
2 SHEETS—SHEET 1.
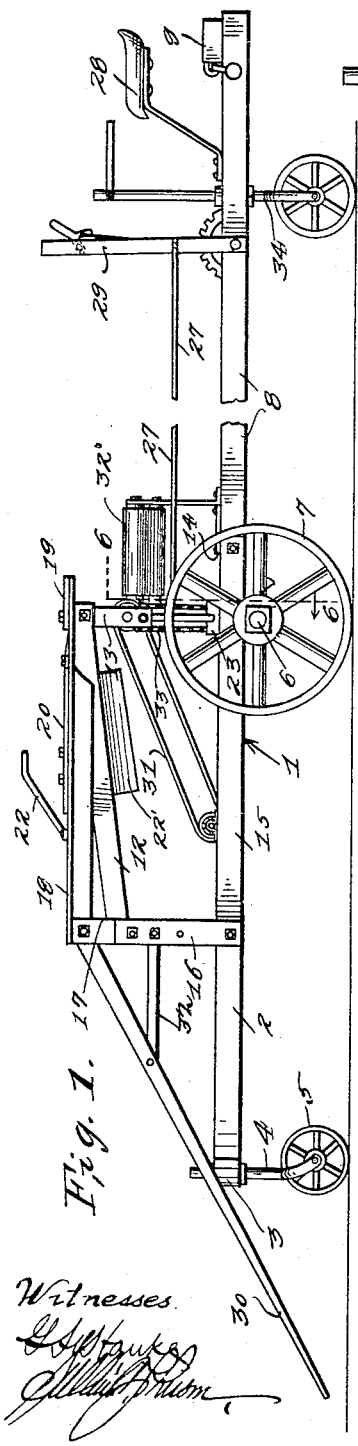
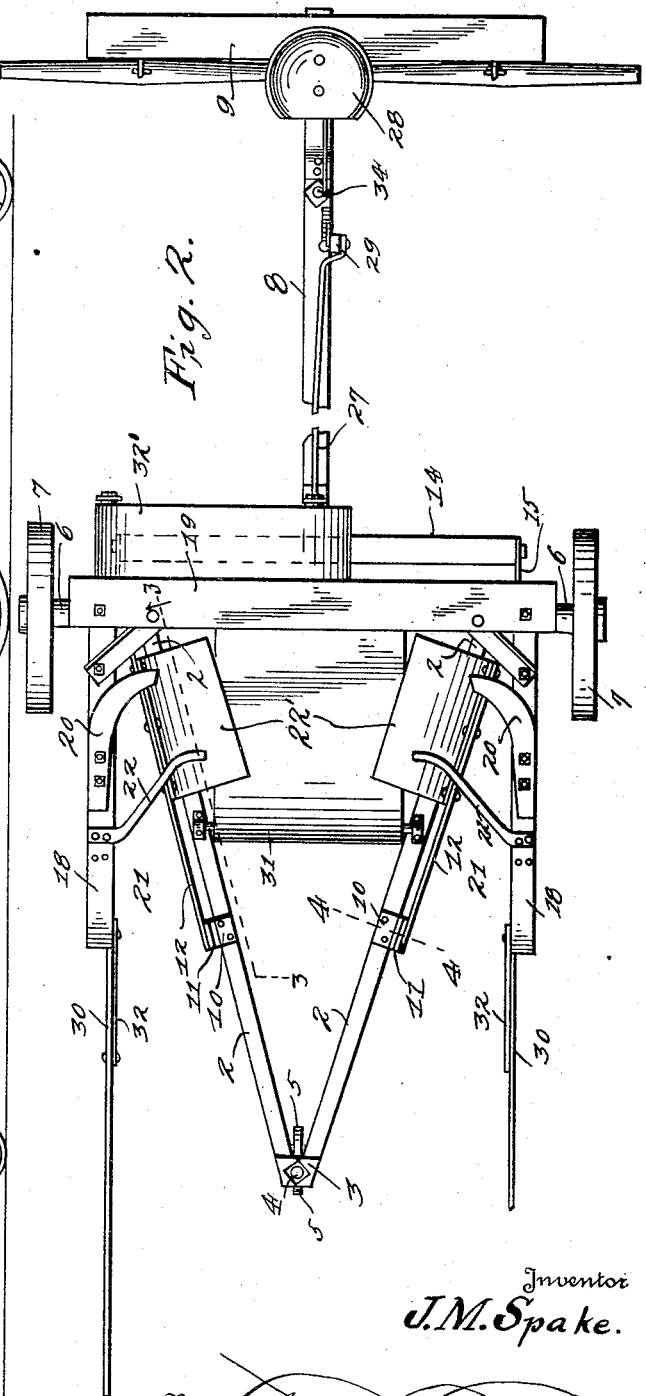
Inventor
J. M. Spake.

J. M. SPAKE.
KAFIR CORN HEADER.
APPLICATION FILED JULY 20, 1915.
1,198,966.
Patented Sept. 19, 1916.
2 SHEETS—SHEET 2.
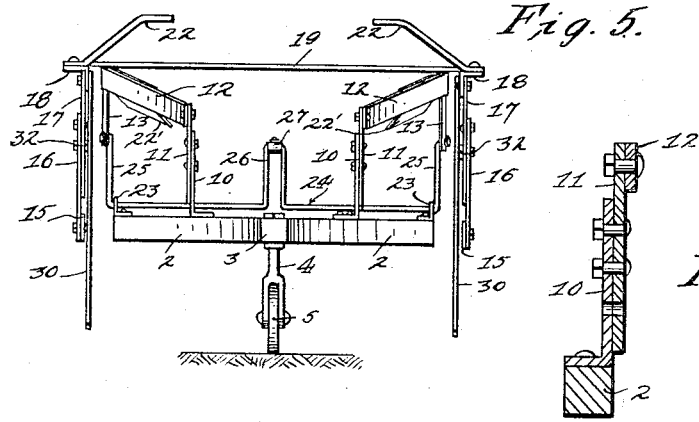
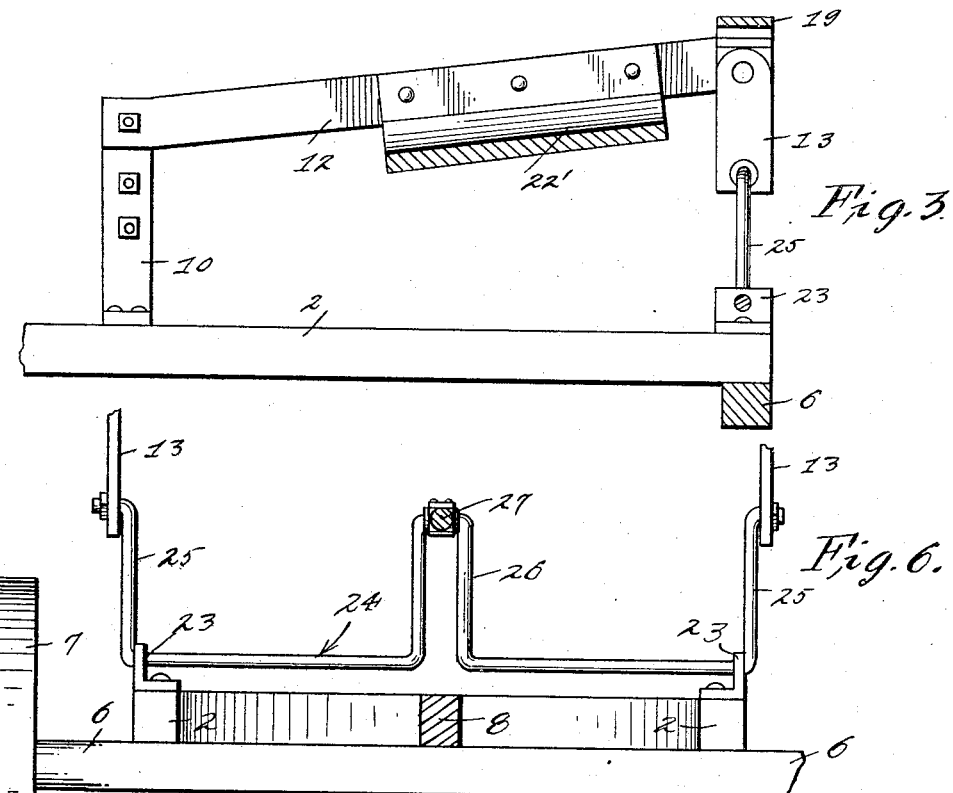
Inventor
J. M. Spake.
Witnesses.
By
Attorneys

UNITED STATES PATENT OFFICE.

JEFF M. SPAKE, OF LENORA, OKLAHOMA.

KAFIR-CORN HEADER.

1,198,966.  Specification of Letters Patent.  Patented Sept. 19, 1916.

Application filed July 20, 1915. Serial No. 40,926.

*To all whom it may concern:*

Be it known that I, JEFF M. SPAKE, a citizen of the United States, residing at Lenora, in the county of Dewey, State of Oklahoma, have invented certain new and useful Improvements in Kafir-Corn Headers; and I do hereby declare the following to be a full, clear, and exact description of the invention, such as will enable others skilled in the art to which it appertains to make and use the same.

The present invention is directed to improvements in machines for heading Kafir corn, and has for its object to construct a machine of this character capable of heading the corn as the machine is propelled across the field.

A further object of the invention is to provide a machine of this type so constructed that the cutting blades may be raised or lowered for heading corn of different height.

A still further object of the invention is to provide a machine of this character having means for conveying the severed heads to one side of the machine.

With these and other objects in view, this invention resides in the novel features of construction, formation, combination and arrangement of parts to be hereinafter more fully described, claimed and illustrated in the accompanying drawing, in which:—

Figure 1 is a side elevation of the machine. Fig. 2 is a top plan view. Fig. 3 is a sectional view on line 3—3 of Fig. 2. Fig. 4 is a similar view on line 4—4 of Fig. 2. Fig. 5 is an end view. Fig. 6 is a sectional view on line 6—6 of Fig. 1.

Referring to the drawing 1 designates a frame, which consists of convergingly arranged side bars 2, the forward ends of which are supported by a casting 3, which is engaged by the spindle 4 of the caster wheel 5. The rear ends of the side bars 2 have journaled therein the axle 6, said axle having keyed to its ends wheels 7. A tongue 8 has its forward end suitably connected to the rear end of the frame 1, and has its rear end provided with doubletree 9, to which the draft animals are attached for propelling the frame across the field. Fixed to the forward ends of the side bars 2 are brackets 10, said brackets having adjustably connected thereto plates 11. Bars 12 are provided with longitudinally disposed slots 12' at their forward ends by which the said ends are pivotally and slidably connected to the plate 11 as shown, while the opposite or rear ends of the said bars are pivotally connected to link plates 13, the purposes of which will appear hereafter. Fixed transversely of the tongue 8 is a bar 14, having pivotally connected to its opposite ends the rear ends of the bars 15, said bars having their forward ends provided with plates 16, said plates being adjustably connected to plates 17. Knife bars 18 are provided and have their forward ends pivotally connected to the upper ends of the plates 17, the rear ends of said bars being rigidly connected to the ends of the brace bar 19, said brace bar being also fixed to the rear ends of the bars 12. Fixed to the upper surface of each knife bar 18 is a curved cutting blade 20, which extends transversely of the spaces between the bars 12 and 18, said spaces being indicated by the numerals 21. Longitudinally adjustable on each knife bar 18 is a finger 22, which is disposed transversely of the space 21, and serves to hold the corn in the space until the corn cut by the blades drops on the downwardly inclined boards 22'.

Mounted on the rear ends of the bars 2 are brackets 23 which support the rock shaft 24, said rock shaft having its opposite ends formed with crank arms 25, which are pivotally connected to the lower ends of the link plates 13, said shaft being provided with a central crank arm 26. A hand lever 29 is mounted on the tongue 8 and has connected thereto the rear end of the link 27, the forward end of which is pivotally connected to the crank arm 26. Mounted on the tongue 8 is a seat 28, the same being arranged so that the occupant thereof may conveniently shift the lever 29. When the lever 29 is shifted it is obvious that the shaft 24 will be rocked, thereby rocking the link plates 13, which action causes the bars 12 and 18, which are pivotally supported at their forward ends to swing vertically, whereby the machine may be adjusted for heading corn of various height.

The corn is guided into the spaces 21, during the movement of the machine forwardly by the gathering fingers 30, which are inclined downwardly, and have their rear ends connected to the forward ends of the bars 18. The fingers 30 may be adjusted vertically upon raising or lowering the inner ends of the bars 32, which are adjustably associated with the plates 16, while the outer ends thereof are pivotally connected to said fingers.

Supported by the frame 1 is an elevator 31, which is disposed longitudinally of the frame, said elevator operating in connection with the elevator 32′ to discharge the cut heads laterally of the machine. The elevators may be of any well known construction, and are operated by sprocket chains 33, which are driven in any well known manner.

The tongue 8 is supported by a truck 34, which may be attached thereto in any suitable manner.

What is claimed is:—

A machine of the class described comprising a wheeled frame, bars arranged in pairs, the bars of each pair being spaced and having their forward ends pivotally supported, link plates pivotally connected to the rear ends of the innermost bars of each pair, a shaft supported by the frame and having crank arms on each end thereof, said crank arms being pivotally connected to the link plates, cutting blades carried by the outermost bar of each pair and traversing the space between each pair of bars, and means for rocking the shaft to simultaneously swing the bars of each pair upwardly and downwardly.

In testimony whereof, I affix my signature, in the presence of two witnesses.

JEFF M. SPAKE.

Witnesses:
W. F. CUHERLY,
R. H. SPECK.

Copies of this patent may be obtained for five cents each, by addressing the "Commissioner of Patents, Washington, D. C."